United States Patent

Kurschwitz et al.

Patent Number: 6,004,009
Date of Patent: Dec. 21, 1999

[54] SYSTEM FOR EXTENDING THE USEFUL LIFE OF COLORED GELS

[75] Inventors: Jennifer D. Kurschwitz, Rochester, N.Y.; Fred Raymond Foster, Verona, Wis.; Gregg F. Esakoff, Huntington Beach, Calif.

[73] Assignee: Applied Coatings, Inc., Rochester, N.Y.

[21] Appl. No.: 08/883,110

[22] Filed: Jun. 26, 1997

Related U.S. Application Data

[60] Provisional application No. 60/020,665, Jun. 28, 1996.

[51] Int. Cl.$^6$ ..................................................... F21V 9/08
[52] U.S. Cl. ........................... 362/293; 359/590; 362/296
[58] Field of Search .................... 359/590, 887, 359/890; 362/293, 296

[56] References Cited

U.S. PATENT DOCUMENTS

| | | | |
|---|---|---|---|
| 4,370,025 | 1/1983 | Sato et al. | 359/590 |
| 4,380,794 | 4/1983 | Lawson | 362/296 |
| 4,536,063 | 8/1985 | Southwell | 359/488 |
| 4,705,356 | 11/1987 | Berning et al. | 359/590 |
| 4,890,208 | 12/1989 | Izenour | 362/294 |
| 5,169,229 | 12/1992 | Hoppert et al. | 362/293 |
| 5,446,637 | 8/1995 | Cunningham et al. | 362/321 |
| 5,552,927 | 9/1996 | Wheatly et al. | 359/359 |
| 5,646,781 | 7/1997 | Johnson, Jr. | 359/590 |
| 5,694,240 | 12/1997 | Sternbergh | 359/590 |

FOREIGN PATENT DOCUMENTS

91/08508  6/1991  WIPO.

*Primary Examiner*—Alan Cariaso
*Attorney, Agent, or Firm*—Eugene Stephens & Associates

[57] ABSTRACT

The invention is directed to a system and method for extending the life of a bluish, greenish, or reddish colored gel, comprising a filter coating situated between a light source and a colored gel, which filter coating has a reflectance band falling in the same wavelength region of the visible light spectrum as the absorption band for the colored gel such that burning or bleaching of the color is prevented or delayed.

11 Claims, 4 Drawing Sheets

SYSTEM FOR EXTENDING THE USEFUL LIFE OF COLORED GELS

This application claims the benefit of U.S. Provisional Application No. 60/020,665 filed on Jun. 28, 1996.

FIELD OF THE INVENTION

This invention relates to a system for extending the life of colored gels used in an optical assembly, for example, light fixtures adapted to image a high-intensity beam of colored light at a distant location. In particular, the invention comprises a thin-film coating that has a reflectance band for visible light that includes the same wavelength region as an adsorption band for the colored gel, thereby significantly reducing its burning or bleaching.

BACKGROUND OF THE INVENTION

In the stage and studio industry, various colored gels may be used in front of spot and flood lights to illuminate a stage with different colors. Exemplary stage lighting apparatus are disclosed in U.S. Pat. Nos. 5,446,637 and 4,890,208. The gels used in such apparatus are typically made of plastic wrap-type or polyester sheets that have dyes in them to make them transmit different colors. Especially with respect to use in spot lights, colored gels that are saturated colors with a bluish or greenish hue have a limited life span before they bleach or burn and need to be replaced. Greenish gels especially are known to have a short life span compared to other colors.

Replacing each gel after it has become bleached or burned requires relatively expensive labor, since most stage lights are typically placed in precarious areas of the theater and there are usually many of them. The replacement of a gel by a stage hand between scenes may, for example, require a ladder and scaffolding. Even though a new gel may cost only a few pennies to purchase, the cost of replacing them during a show may cost several dollars. Furthermore, the more light out of a spot light or other such lighting fixtures, the shorter the life span of the gel. Nevertheless, manufacturers of spot lights are always looking for ways to get more light and high energy density out of their devices. It would be desirable, therefore, to be able to significantly extend the useful life of a colored gel and to enhance its performance without significantly reducing the amount of light available for use. The present invention fulfills that need by means of inserting a substrate having a thin film coating with certain reflectance properties between the colored gel and the light source of the lighting apparatus in which the gel is used.

Thin film technology has been used for a number of years to control the transmittance and/or reflectance of coated surfaces. By controlling the thickness and index of refraction of each film in a stack or array of thin films constituting a coating, one can tailor the reflective and transmissive characteristics of the coating. The design of such films and the principles used to achieve such results are well known to those skilled in the art as is the general knowledge of how to deposit the various thin films on various substrates. See, for example, MacLeod, H. A., *Thin-Film Optical Filters* (McGraw-Hill Publishing Co., N.Y. 1989); Thelen, Alfred, *Design of Optical Interference Coatings* (McGraw-Hill Book Co., N.Y. 1989); and Heavens, O. S., *Optical Properties of Thin Solid Films* (Dover, N.Y. 1965)

Various classes of coatings exist based not only upon the materials used to form said coatings, but based upon spectral reflectance characteristics as well. For instance, reflective coatings have long been available which transmit in the infrared region and reflect all or most of the visible portion of the spectrum. Such coatings are known generically as "cold mirrors." Alternately, coatings are also known which transmit the infrared portion of the spectrum and reflect only a fraction of the visible spectrum. These coatings are generically known as "color correcting cold mirror" coatings. Still other coatings, which reflect the infrared and transmit visible light, are known as "hot mirrors." They are used, for example, in overhead projectors. Coatings such as Optivex® are commercially available for use in filters to reflect UV but transmit visible light. They are sometimes used for track lighting and in museums to prevent fading of the dyes or pigments used in paintings or other exhibits.

For many commercial applications such coatings are provided on glass substrates in the form of reflector blanks or filter blanks. See, for instance, U.S. Pat. No. 4,380,794. Such coatings have many applications. For example, U.S. Pat. No. 5,169,229, discloses an optical coating deposited upon a plastic support article in order to shield the substrate from harmful UV (ultraviolet) radiation.

None of the cited references teach or suggest that a thin-film coating could effectively and efficiently extend the life of colored gels used in an optical assembly or a light fixture adapted to image a high-intensity beam of colored light at a distant location.

SUMMARY OF THE INVENTION

The invention is directed to an optical assembly which employs a reddish, bluish or greenish colored gel. The optical assembly comprises a mirror/filter coating on a substrate such that the coating is situated between a light source and the colored gel. The mirror/filter coating has a reflectance band falling in the same wavelength region of the visible light spectrum as an absorption band for the colored gel being used. The invention is also directed to a method of using such a mirror/filter coating to extend the life of bluish or greenish colored gels that are used in various stage & studio lighting applications, including lighting fixtures commonly used in theater, television, and architectural applications.

DETAILED DESCRIPTION OF THE INVENTION

As indicated above, the present invention is directed to a system for extending the life of bluish, reddish, or greenish colored gels used in various optical assemblies or lighting apparatus, especially light fixtures adapted to image a high-intensity beam of colored light at a distant location. The present invention includes a filter/mirror coating that has a reflectance band falling in the same wavelength region as an absorption band for a colored gel such that burning or bleaching of the colored gel is significantly reduced.

Figure 1:
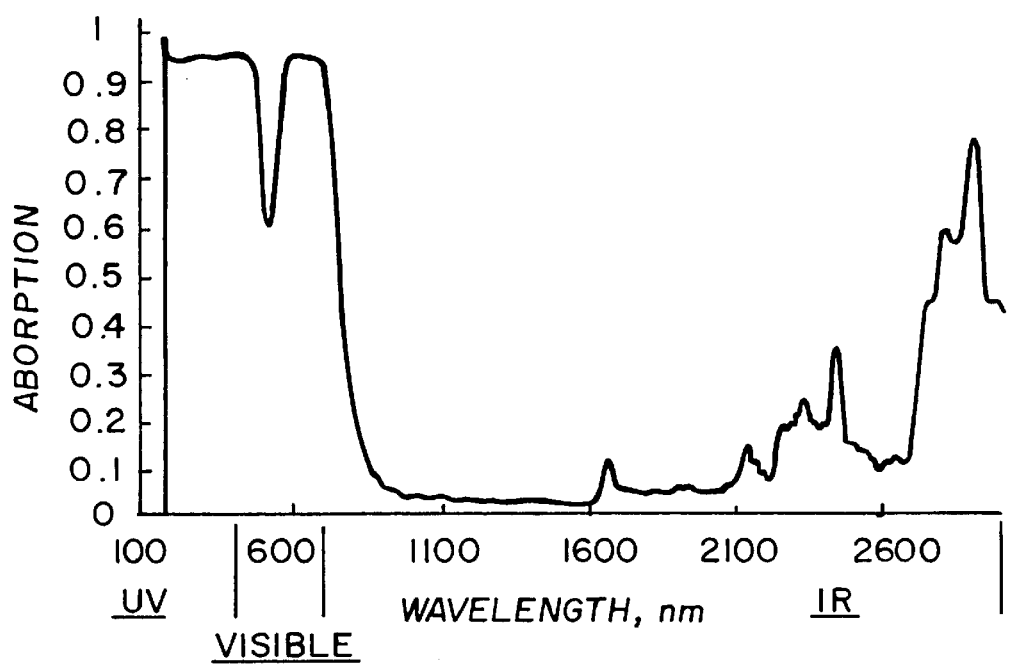
FIG. 1 shows a computed absorption curve of a dark green gel in the UV, visible, and IR wavelength region.

The present invention can be better understood by reference to the computed absorption curve of a colored gel. For example, a dark green gel has an absorption curve that extends from 175 nm to 3300 nm in the UV, visible, and IR wavelength region, as shown in FIG. 1. Wavelengths from 175–400 nm are in the ultraviolet region (UV), from 400–700 nm are in the visible region, and 700+ are in the infrared region (IR).

Removing the IR light transmitted by the bulb of the lighting fixture does not entirely prevent the bleaching and burning of colored gels used in the lighting fixture. Most stage lights now have cold mirrors within the optical system to prevent IR light from being projected toward the stage and performers.

Removal of light in the UV region does not significantly reduce the bleaching and burning of the exposed colored gels. An Optivex® UV filter, commercially available from Bausch & Lomb Incorporated, Thin Film Technology Division (Rochester, N.Y.) rejects all UV wavelengths from 175–400 nm. This filter was used in a typical spot light and the gels were still found to burn in the same fashion.

Figure 2:
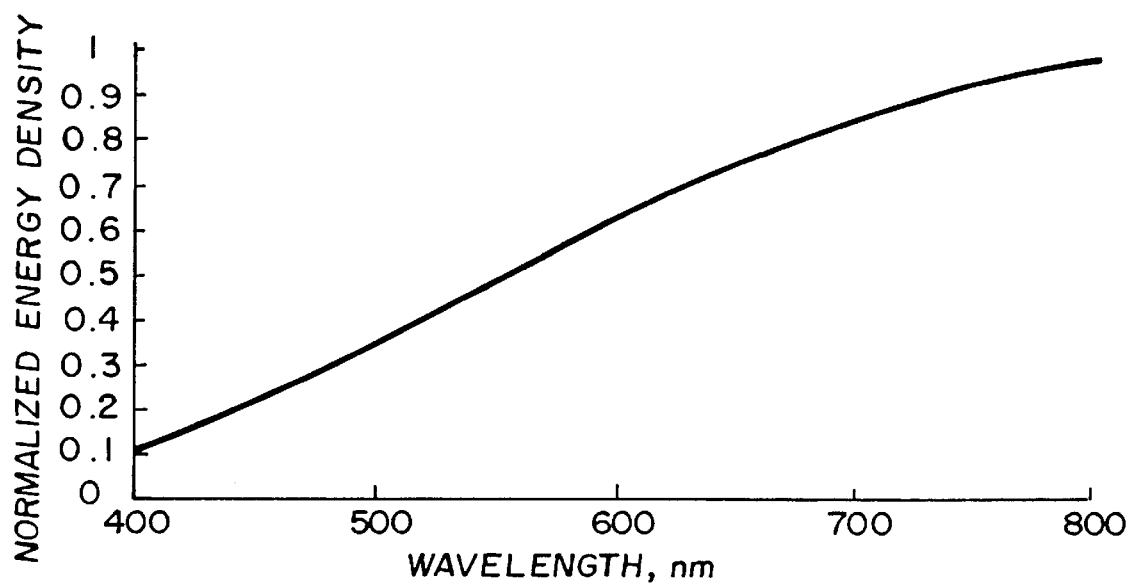
FIG. 2 shows the normalized energy density spectrum for a 3200K black body similar to a tungsten-halogen light bulb found in a typical spot light.
Figure 3:
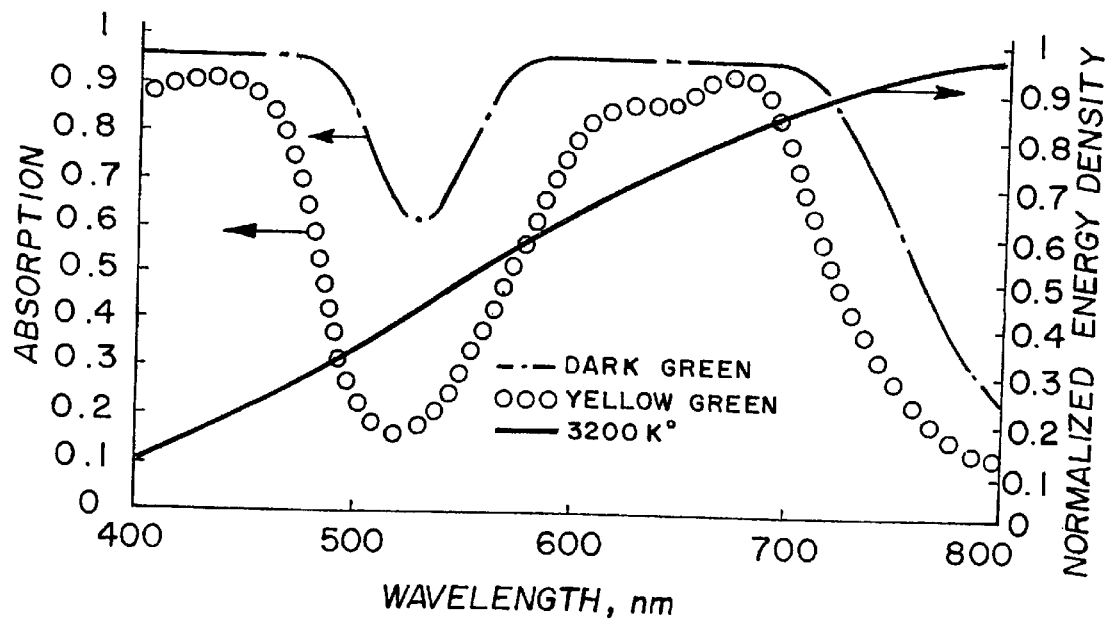
FIG. 3 shows the computed absorption of a green gel in the visible wavelength spectrum for both a dark green and yellow-green gel superimposed on the spectrum shown in FIG. 2.
Figure 6:
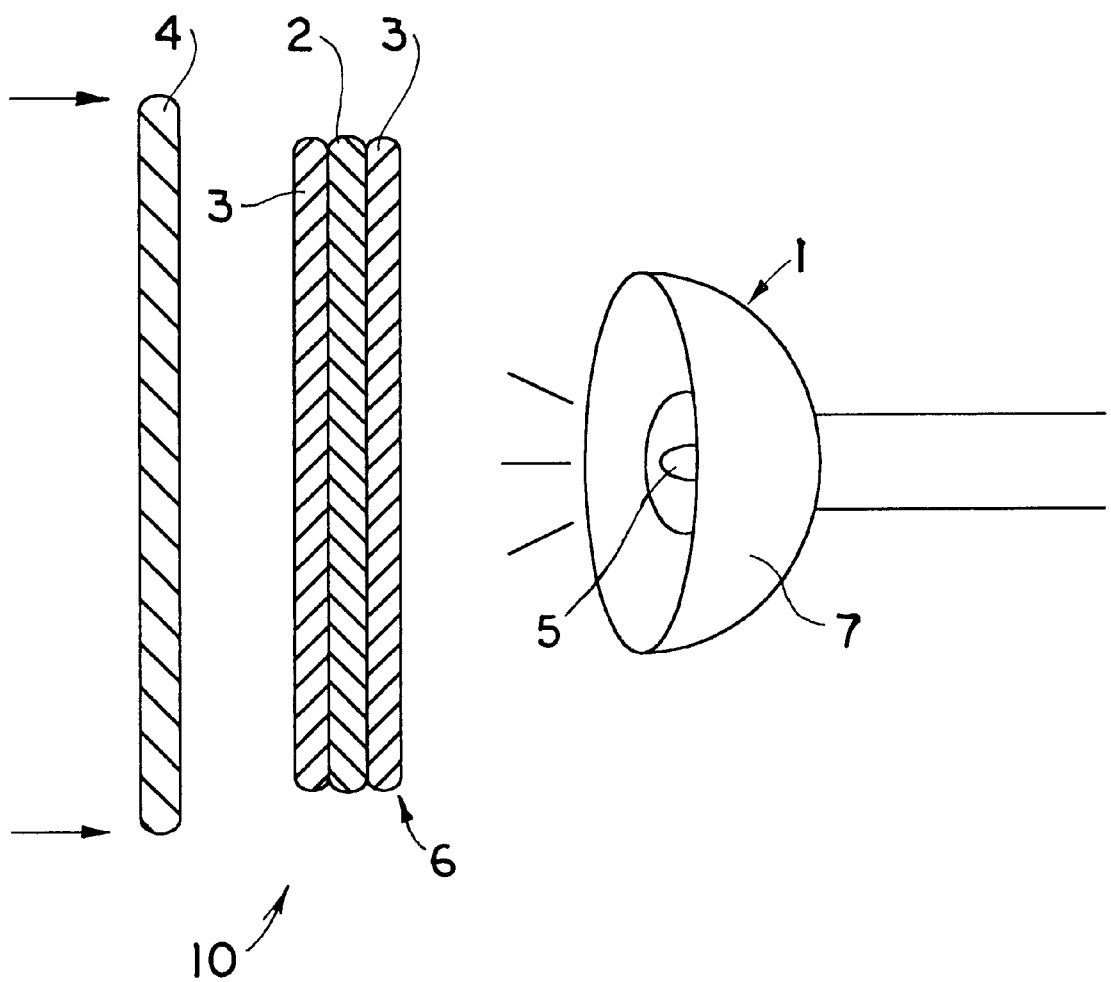
FIG. 6 is a schematic view of one embodiment of the optical assembly according to the invention.

The light fixture 1 may employ a tungsten-halogen, arc, plasma, or other light source (see FIG. 6). Most typically, a spot light employs a tungsten-halogen light bulb that puts out energy similar to a blackbody cavity at a temperature of 3200 K. FIG. 2 shows the normalized energy density spectrum for a 3200 K black body. Referring to FIG. 2, one can see that the majority of the energy within the visible spectrum, i.e., 400 to 700 nm, of a tungsten light bulb falls between 500–700 nm. If this curve is overlapped with the absorption curve for a greenish gel, for example, one can see that the gel has a high amount of absorption in the highest energy regions of the light bulb in the visible spectrum. FIG. 3 shows the computed absorption of greenish gel in the visible wavelength region for a dark-green gel and, for comparison, a yellow-green gel, superimposed on the spectrum shown in FIG. 2. It is evident that the high energy and gel absorption region is in the range of approximately 500 to 700 nm. When all of that visible energy emitted by the bulb is absorbed by the gel, the absorption levels cause the gel to heat up, bleach, and then burn.

The present invention is applicable to sufficiently saturated colors meeting certain requirements for saturation (chroma). The term "sufficiently saturated color" is herein defined as a color having a spectrum in which the absorption is at least 90% or greater over a region of at least about 40 nm in the visible spectrum, preferably in which the absorption is at least 95% over a region of at least about 60 nm in the visible spectrum, more preferably in which the absorption is at least about 95% over a region of at least about 80 nm in the visible region. For example, the dark green gel in FIG. 3 is a sufficiently saturated color, whereas the yellow-green gel is not sufficiently saturated for the present invention. As shown in FIG. 3, the yellow-green gel has an absorption peak at 90% or above over a region of only about 30 nm.

The present invention 10 therefore uses a thin-film array 3 that rejects the energy in the highest absorption regions before it hits the gel 4, thereby extending the life of the gel 4 being used (see FIG. 6). A typical filter to reject that energy is a mirror or energy filter specifically built for the absorption regions of different color gels. Energy filters in general are commercially available from a variety of sources, including Bausch & Lomb Incorporated, Thin Film Technology Division (Rochester, N.Y.); OCLI (Santa Rosa, Calif.); DSI (Santa Rosa, Calif.); and High-End Systems (TX).

In accordance with this invention, a protective filter for a bluish, greenish, or reddish gel could be designed and manufactured wherein the array of thin films is selected to reflect light in the visible light spectrum in a wavelength region between about 400 and 700 nm. For the bluish and dark green gel spectrums shown in FIGS. 4 and 5, for example, the array of thin films should be designed such that a majority of the energy of the light incident on the array of thin films in the region between 600 and 700 nm is reflected by the array of thin films, preferably such that at least about 80 percent of the energy of the light incident on the array of thin films in the region between 630 and 750 nm is reflected by the array of thin films.

The terms "region" or "spectrum," as used herein, are used interchangeably throughout this specification, to denote any continuous wavelength range of the electromagnetic spectrum spanned by two distinct wavelengths.

Figure 4:
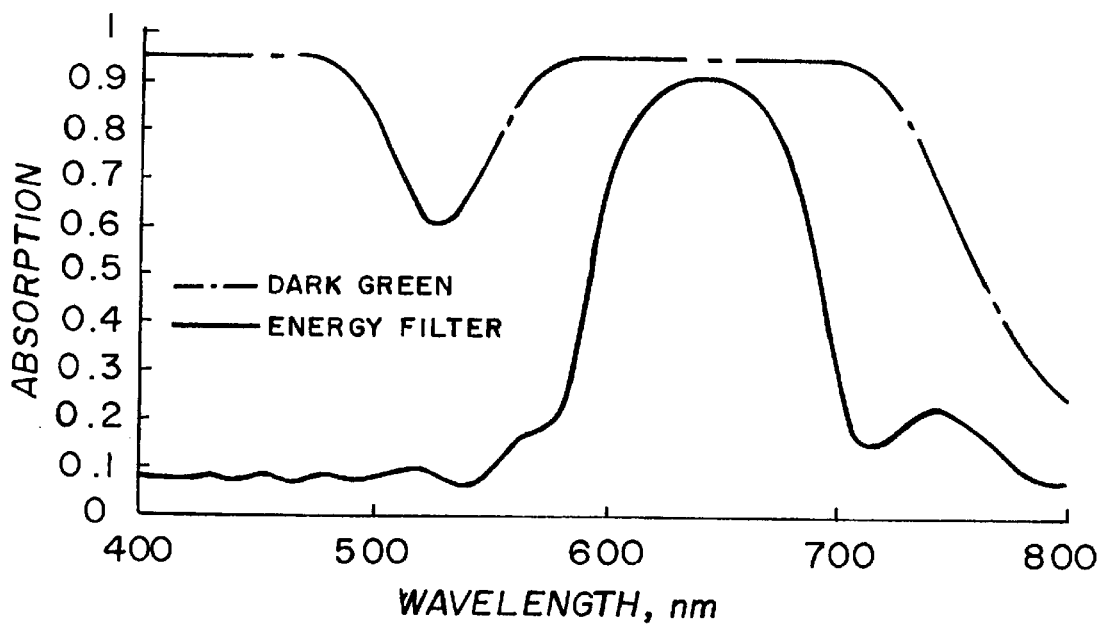
FIG. 4 shows a computed absorption for an energy filter designed according to the present invention, which energy filter could be used to extend the life of a greenish gel.
Figure 5:
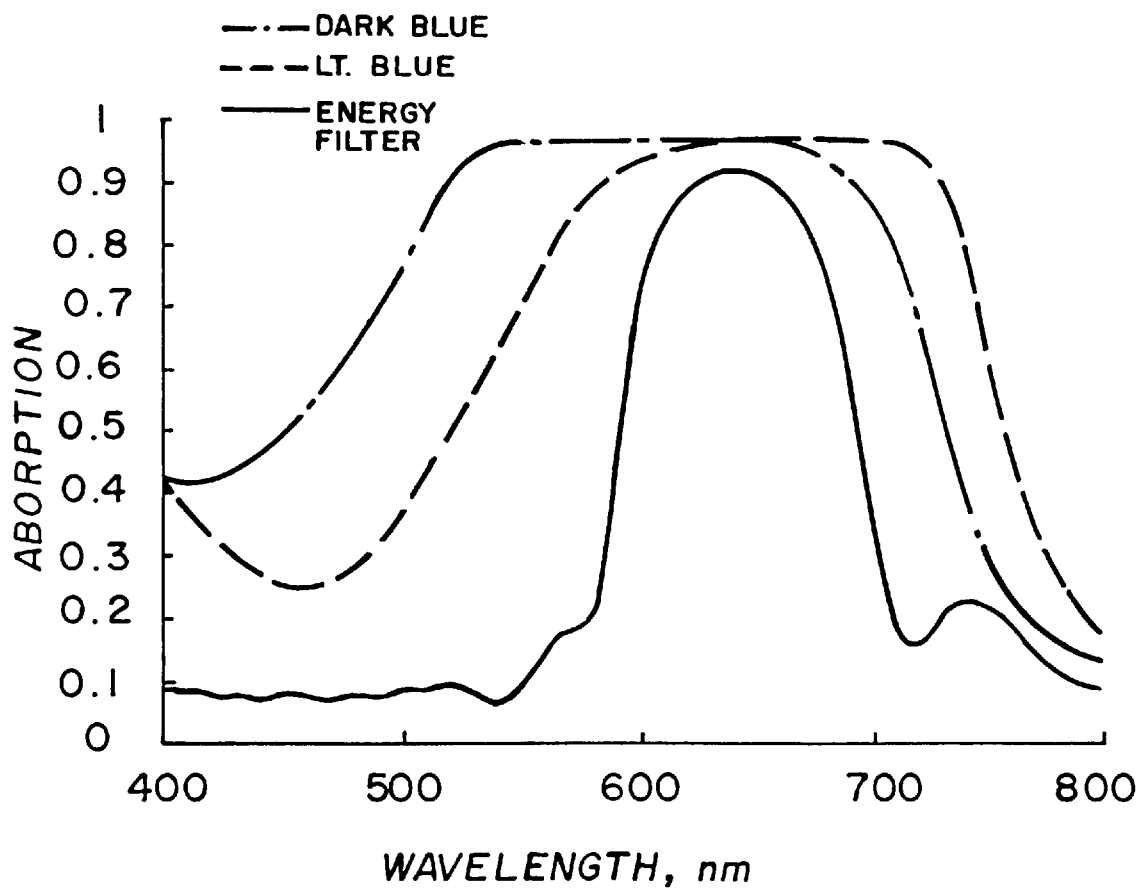
FIG. 5 shows the computed absorption of a light blue and dark blue gel in the visible wavelength spectrum superimposed on the absorption shown for an energy filter according to the present invention.

FIG. 4 shows a computed design for an energy filter that could be used to extend the life of greenish gels. The reflection band of this filter falls within the absorption band of the greenish gel. The same or similar filter design could be used for a bluish gel, as shown in FIG. 5, which is a graph of the computed absorption of a sufficiently saturated light-blue gel and a sufficiently saturated dark-blue gel in the visible wavelength region superimposed on the absorption for an energy filter according to the present invention.

In general terms, the design of an array of thin films according to the present invention, and the materials and processes involved, are well known to those skilled in the art. By alternating higher refractive index materials with lower refractive index materials those skilled in the art can effect a reflectance or transmittance characteristic as desired by means of controlling constructive and destructive interference at various wavelengths.

Typically, the layer components of the thin-film multi-layer will have refractive indices between 1.36 and 4.0 and will have thicknesses between 10 and 1000 nm (0.01 to 1 micron). These limits are dependent upon the desired result, and upon the refractive index of not only the lower index material, but also the refractive index of the higher index material. The lower index materials which are suitable for use in the present invention include, but are not limited to, $MgF_2$, $Al_2O_3$, $ThO_2$, $ThF_4$, $SiO_2$, $NdF_3$, $Na_3AlF_6$ (cryolite), NaF, MgO, LiF, $LaF_3$, $CeF_2$ and $AlF_3$.

The higher index materials are formed from various dielectrics including, but not limited to, $TiO_2$, $Ti_2O_3$ and other $Ti_xO_y$ derivatives, $HfO_2$, CdS, $CeO_2$, $Ta_2O_5$, ZnS, and $ZrO_2$. In general, the class of "higher refractive index" materials will have refractive indices in the range of 1.50 to 2.40 as deposited. As deposited in the array called for by the present invention, the coatings will preferably be between 40 and 400 nm in thickness, although it is understood that the actual film thickness will be influenced by the refractive index of the material and the desired spectral characteristics of the reflector. In general the thickness of the layers can be, but are not necessarily limited to, a quarter wavelength in thickness of the wavelengths one wants to fully reflect.

The thin-film materials can be deposited in a number of ways. Physical vapor deposition has been found to be the preferred method. A number of quarter-wave layers are successively coated on the surface of a substrate, so that layers formed of material having low refractive index alternate with layers formed of material having high refractive index. The number of quarter-wave layers (each having an optical thickness approximately equal to a desired quarter wavelength) coated on the substrate will depend on the desired optical properties of the filter for a particular colored gel. The number of layers can suitably vary from about six to about 50, preferably about 10 to 25. The invention in its broadest sense is not limited to filters having any specific number of layers. The layer immediately adjacent to the substrate may be a member of the subset of materials having low refractive index or may be a member of the subset having high refractive index. In one illustrative embodiment of the invention, the substrate is glass, the even layers are composed of silicon dioxide and the odd layers are composed of titanium dioxide. However, the layers in each subset need not all have identical refractive index.

The design of each of the preferred embodiments of the invention can be determined using an iterative optimization technique in which the optical constants of the substrate and film materials are known and the desired reflectance spectrum is specified. The thickness of each layer is then found. To insure that the filter can be conveniently and economically manufactured in commercial quantities, each layer's thickness must be within a specified tolerance of optimum thickness such that any small variations in each layer's thickness will not significantly alter the filter's reflectance curve. Those of ordinary skill in the art will be familiar with, and capable of performing such an iterative optimization operation, as a matter of routine design. The operation will typically include the steps of choosing a merit function, and then minimizing the merit function utilizing an optimization routine, to determine the optimal set of design parameters. For example, U.S. Pat. No. 4,536,063 discusses the manner in which an optical coating design merit function may be chosen and then minimized, to generate a desired optical coating design.

The substrate 2, as seen in FIG. 6, can be made from glass or any plastic that is thermally stable within the temperature cycles anticipated for the particular optical device being designed. A number of plastic materials suggest themselves and without providing a complete list, these include polysulfones, polyetherimides, polyarylates, acrylics, polyesters, and polycarbonates. The actual choice of material may depend upon the light source, power, the use of the lamp, the cost and life of the lamp and other considerations.

A glass or plastic substrate 2 (see FIG. 6) can be coated with the filter coating 5 on one or both sides and inserted in the optical path of the spot light, or other light source 1 to block the light before it reaches the gel 4 . In another embodiment of the present invention, the thin-film array comprising the energy filter may be coated directly onto the gel itself.

The substrate 2 can be flat or contoured, depending on the optical system involved. For example, a contoured shape may be advantageous when the filter 6 is situated in front of and in proximity to a lamp 1 , in order to prevent reflected energy from reaching and adversely affecting the bulb in the lamp 1.

The filters for extending the life of colored gels can be used in a variety of lighting apparatus, for example, those shown in U.S. Pat. No. 5,44,637 and U.S. Pat. No. 4,890, 208; both hereby incorporated by reference in their entirety. Such lighting apparatuses, as seen in FIG. 6, typically have a concave or ellipsoid reflector ellipsoidal reflector 7 having a base at one end and a mouth at the other end, the reflector 7 being substantially circumferentially symmetrical about a longitudinal axis. The reflector 7 reflects light emitted by the filaments 5 of the lamp 1 positioned within the reflector 7 and forms a beam that is imaged to a predetermined location. Typically, light emitted by the filaments 5 of the lamp 1 are reflected by the reflector 7 through a gate assembly, to one or more lenses, which form a generally collimated beam that is projected through one or more colored media and away from the lighting apparatus. In another embodiment, guide means and a pivotal retainer for carrying one or more colored media in a media frame are positioned at the forward end of a generally cylindrical front barrel of the lighting apparatus. Other embodiments are, of course, possible. For example, mirrors may be used to aim the beam in different directions. The colored media may be provided before, after, or between the lenses in an optical assembly. A color wheel or disc having a number of discrete colored filters may be used or several strips of colored film can be wound or unwound around a reel, wherein the films in combination yield a comprehensive range of colors and hues. In all cases, however, the filter according to the present invention must be situated between the light source and the colored media. Conventional lighting apparatus can be readily adapted to suitably hold an energy filter according to the present invention in the optical path of a beam of light. For example, a flat filter according to the present invention can be sandwiched on a colored sheet. In technically more advanced systems, a flat or contoured filter according to the present invention can be placed nearer the lamp. For example, a shutter/pattern assembly or the like in the second focal region of the lamp reflector could be modified with slots to insert a filter into the path of the beam being projected. Conventionally, such slots are sometimes provided to insert a pattern template.

The following examples illustrate some of the embodiments of the present invention. The examples are not intended, however, to limit the scope of the invention.

EXAMPLE 1

Nineteen samples of a 650–850 nm rejection filter were prepared. The samples were borosilicate 3×3" cut glass coated with the multi-layer array described in Table 1 below.

TABLE 1

| Layer Number | Material | Optical Thickness @ 550 nm | Physical Thickness (nm) |
| --- | --- | --- | --- |
| 1 | SiO$_2$ | 0.21 | 80.33 |
| 2 | TiO$_2$ | 0.85 | 196.02 |
| 3 | SiO$_2$ | 0.43 | 160.65 |
| 4 | TiO$_2$ | 0.85 | 196.02 |
| 5 | SiO$_2$ | 0.43 | 160.65 |
| 6 | TiO$_2$ | 0.85 | 196.02 |
| 7 | SiO$_2$ | 0.43 | 160.65 |
| 8 | TiO$_2$ | 0.85 | 196.02 |
| 9 | SiO$_2$ | 0.43 | 160.65 |
| 10 | TiO$_2$ | 0.85 | 196.02 |
| 11 | SiO$_2$ | 0.43 | 80.33 |

Measurements were taken on each of the 19 samples. The bandpass filter was made to face toward a tungsten filament of a bulb within a "Source 4"® spot light, manufactured by ETC, Inc. (Middleton, Wis.) so that the energy was not reflected into the glass sample. The back side of the samples had an antireflection coating that faced the gel. The average transmission over the 400–600 nm region was approximately 93%. Test samples 3 and 14 with bluish or greenish gels in series were also measured on a spectrophotometer and their x/y color coordinates and light level difference calculated versus a 3200K source. As shown in Table 2 below, the filters did not adversely affect the color produced by the gels. The "perceived color" of the gels when used in series with the filters were also tested and found satisfactory.

TABLE 2

| Part Measured | x | y | Y |
|---|---|---|---|
| Blue Gel | .1398 | .1063 | 2.52 |
| Blue Gel with Filter 3 | .1355 | .1074 | 2.34 |
| Blue Gel with Filter 14 | .1354 | .1070 | 2.37 |
| Ave | .0044 | .0009 | 0.17 |
| Green Gel | .2129 | .7171 | 10.63 |
| Green Gel with Filter 3 | .212 | .7182 | 10.08 |
| Green Gel with Filter 14 | .2118 | .7182 | 10.15 |
| Ave | .0010 | .0011 | 0.52 |

Total light absorbed values for the bluish and greenish gels before and after the use of the sample filters were also computed, as well as the total light absorbed with a red gel for comparison. Table 3 shows the calculated relative luminous absorbence of the colored gels with and without a filter when using a 3200 K light source.

TABLE 3

| Part Measured | % Luminous Absorptance |
|---|---|
| Green Gel | 82.44 |
| Green Gel with Filter | 44.87 |
| Blue Gel | 71.98 |
| Blue Gel with Filter | 43.11 |
| Red Gel | 50.49 |

The previous examples demonstrate certain aspects of the present invention, but does not, however, limit the full scope of the invention. Those of ordinary skill will appreciate that various other embodiments or designs can be made without departing from the invention. Accordingly, the invention is defined with reference only to the following claims.

What is claimed is:

1. An optical assembly with a lamp configured to image a beam of colored light at a distant location, comprising:
   (a) a light source having UV, visible and IR wavelength components;
   (b) a sufficiently saturated bluish, greenish, or reddish colored gel;
   (c) and situated between the light source and the colored gel, a filter comprising an array of thin films of alternating high index of refraction and low index of refraction dielectric materials deposited upon a surface of a substrate, said array selected such that a desired spectrum of visible light is reflected from said filter so that the filter has a reflectance band that reflects a wavelength region of a visible light spectrum known to be absorbed by a particular color gel material selected for the assembly.

2. The optical assembly of claim 1, wherein the substrate is the colored gel itself.

3. The optical assembly of claim 1, wherein the lamp has one or more filaments and wherein the lamp is situated within the concave opening of a concave ellipsoidal reflector.

4. The optical assembly of claim 1, wherein the substrate is a transparent plastic or glass material that is coated with the array of thin films on one or both sides.

5. The optical assembly of claim 1, wherein the array of thin films is selected to reflect light in the visible light spectrum in the wavelength region between about 500 and 800 nm.

6. The optical assembly of claim 5, wherein the array of thin films is designed such that a majority of the energy of the light incident on the array of thin films in the region between 600 and 700 nm is reflected by the array of thin films.

7. The optical assembly of claim 6, wherein the array of thin films is designed such that at least about 80 percent of the energy of the light incident on the array of thin films in the region between 630 and 750 nm is reflected by the array of thin films.

8. The optical assembly of claim 1, wherein said substrate is made from a plastic material selected from the group consisting of polycarbonate, polysulfone, polyacrylate, polyacrylic, and polyetherimide polymer.

9. The optical assembly of claim 1, wherein the array of thin films of alternating high and low index of refraction dielectric materials are alternating layers of a material selected from the group consisting of $TiO_2$ and $SiO_2$, ZnS and $MgF_2$, $TiO_2$ and $MgF_2$, and $ZrO_2$ and $SiO_2$.

10. An article comprising a sufficiently saturated bluish, greenish, or reddish colored gel material upon which is deposited an array of thin films of alternating high index of refraction and low index of refraction dielectric materials, wherein the array is adapted to reflect a desired spectrum of visible light falling within a wavelength region of a visible light spectrum known to be absorbed by a particular color gel material selected for the article.

11. The article of claim 10, wherein the colored gel material is in the form of a sheet.

* * * * *